United States Patent
Chartier et al.

(10) Patent No.: US 11,752,570 B2
(45) Date of Patent: Sep. 12, 2023

(54) DEVICE AND METHOD FOR THE MACHINING OF AN END OF AN ELEMENTARY PANEL FOR ITS FRICTION STIR WELDING

(71) Applicant: STELIA AEROSPACE, Rochefort (FR)

(72) Inventors: David Chartier, Toulouse (FR); Franck Darras, Meaulte (FR); Yannick Wattiez, Thiant (FR)

(73) Assignee: AIRBUS ATLANTIC, Rochefort (FR)

( * ) Notice: Subject to any disclaimer, the term of this patent is extended or adjusted under 35 U.S.C. 154(b) by 1239 days.

(21) Appl. No.: 16/283,436

(22) Filed: Feb. 22, 2019

(65) Prior Publication Data
US 2019/0262933 A1    Aug. 29, 2019

(30) Foreign Application Priority Data

Feb. 23, 2018 (FR) ...................................... 1851602

(51) Int. Cl.
*B23P 23/04* (2006.01)
*B23C 3/12* (2006.01)
(Continued)

(52) U.S. Cl.
CPC .............. *B23K 20/126* (2013.01); *B23C 3/12* (2013.01); *B23K 20/12* (2013.01); *B23K 20/122* (2013.01);
(Continued)

(58) Field of Classification Search
CPC ... B23Q 3/155–3/15793; B23Q 11/005; B23Q 11/006; B23Q 9/0028;
(Continued)

(56) References Cited

U.S. PATENT DOCUMENTS 5,921,729 A * 7/1999 Kikuchi ............... B23Q 39/026
                                                           409/203
5,971,247 A   10/1999 Gentry
(Continued)

FOREIGN PATENT DOCUMENTS

GB      1413106 A     11/1975
GB      2145020 A  *  3/1985
(Continued)

OTHER PUBLICATIONS

Machine Translation of KR 10-2014-0024165-A, which KR '165 was published Feb. 2014.*
(Continued)

*Primary Examiner* — Erica E Cadugan
(74) *Attorney, Agent, or Firm* — KOS IP LAW LLP (57) ABSTRACT

Device for machining an end of an elementary panel for its subsequent friction stir welding, the elementary panel comprising a metal body defining two opposite faces, the machining device comprising a chassis, at least two guiding members configured to guide a first face of the elementary panel, at least one machining tool mounted on the chassis, the machining tool being positioned between the two guiding members and at least one pressure member mounted on the chassis and configured to exert a pressure on a second face of the elementary panel so as to press the elementary panel against the guiding members along the horizontal reference direction.

9 Claims, 7 Drawing Sheets (51) Int. Cl.
  *B23K 20/12* (2006.01)
  *B23Q 11/00* (2006.01)
  *B23Q 3/00* (2006.01)
  *B23Q 3/02* (2006.01)
(52) U.S. Cl.
  CPC .............. *B23P 23/04* (2013.01); *B23Q 3/002* (2013.01); *B23Q 3/005* (2013.01); *B23Q 11/005* (2013.01); *B23Q 11/0042* (2013.01); *B23C 2220/20* (2013.01); *B23C 2220/40* (2013.01); *B23C 2255/08* (2013.01); *B23Q 3/02* (2013.01); *Y10T 29/5176* (2015.01); *Y10T 409/3042* (2015.01); *Y10T 409/304144* (2015.01); *Y10T 409/308624* (2015.01)
(58) Field of Classification Search
  CPC ... B23Q 9/0071; B23K 20/12–20/1295; B23K 2101/18; B23P 23/04; B23C 3/12–3/128; B23C 2220/16; B23C 2220/20; B23C 2220/40; B23C 2255/00–12; Y10T 409/304144–304256; Y10T 409/306496; Y10T 409/308176; Y10T 409/3084; Y10T 409/308624; B25J 11/006

USPC .................. 409/138–140, 180, 210, 214, 218
See application file for complete search history.

(56) References Cited

U.S. PATENT DOCUMENTS

2017/0266756 A1* 9/2017 Katoh ................ B23K 20/1255
2018/0133833 A1* 5/2018 Uemura ............ B23K 20/1245

FOREIGN PATENT DOCUMENTS

| JP | H10 52773 A | | 2/1998 |
| JP | 2001 047262 A | | 2/2001 |
| JP | 2006-142434 A | * | 6/2006 |
| JP | 2012-000698 A | * | 1/2012 |
| KR | 10-2014-0024165 A | * | 2/2014 |

OTHER PUBLICATIONS

Search Report from French Intellectual Property Office on corresponding FR application (FR 1851602) dated Nov. 2, 2018.

* cited by examiner

DEVICE AND METHOD FOR THE MACHINING OF AN END OF AN ELEMENTARY PANEL FOR ITS FRICTION STIR WELDING

TECHNICAL FIELD

The present invention relates to the field of manufacturing an aeronautical structure from elementary metal panels that are assembled by welding, in particular by welding know to the person in the art as "Friction Stir Welding" or "FSW".

In order to perform friction stir welding, two ends of elementary metal panels are positioned adjacently to one another and a probe is rotationally driven at a high speed at the interface of the two metal panels in order to locally melt the material of the elementary metal panels and to weld them together.

Figure 1A:
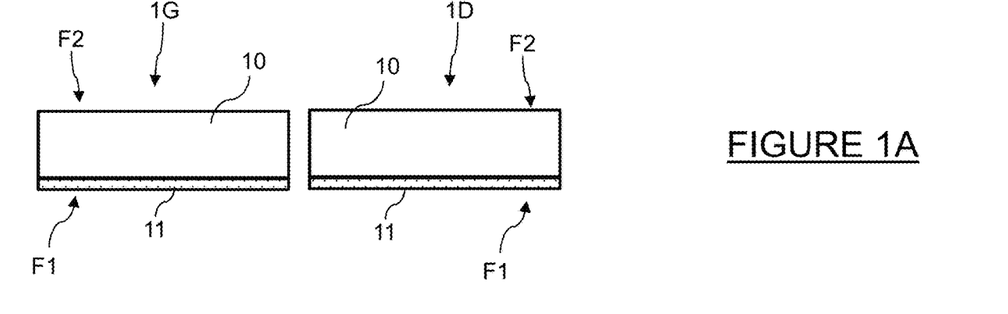
FIG. 1A is a cross-section view of the ends of aeronautical elementary panels before a decladding step.

In practice, elementary metal panels cannot be welded directly after manufacturing and they must be prepared prior to welding. FIG. 1A shows a left elementary metal panel 1G and a right elementary metal panel 1D, each comprising a central metal body 10, for example made of aluminum. In this example, each central metal body 10 comprises a lower face F1 with a cladding 11 and an upper face F2 without a cladding. By way of example, each cladding 11 is in the form of a thickness of pure aluminum resulting from the laminating of the elementary panel 1G, 1D.

In the case of welding by friction stir welding, one purpose is to remove the cladding 11 (also known as coating), so that the material of the cladding 11 does not mix with the material of the central metal body 10 during welding. More generally, the purpose is to control the thickness of the end of the metal panel that is to be welded.

Also, one preparation step consists in removing locally the thickness of the cladding 11 on the ends of the elementary metal panels 1G, 1D to be welded. This step is known to the person skilled in the field as "decladding". The decladding step is complex as it requires the removal of the cladding 11 with a high level of accuracy. Indeed, if the removed thickness is insufficient, the cladding 11 is not fully removed and the material of the cladding 11 risks being mixed with the material of the central metal body 10, which would degrade the quality of the weld bead. On the other hand, if the removed thickness is too great, the thickness of the central metal body 10 is then too small and less than the length of the friction probe. In this case, the weld bead will not feature optimal qualities.

Figure 1B:
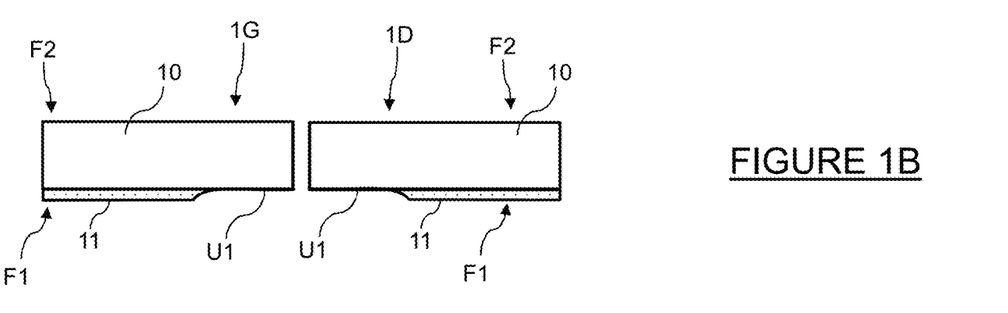
FIG. 1B is a cross-section view of the ends of aeronautical elementary panels after a decladding step.
Figure 1C:
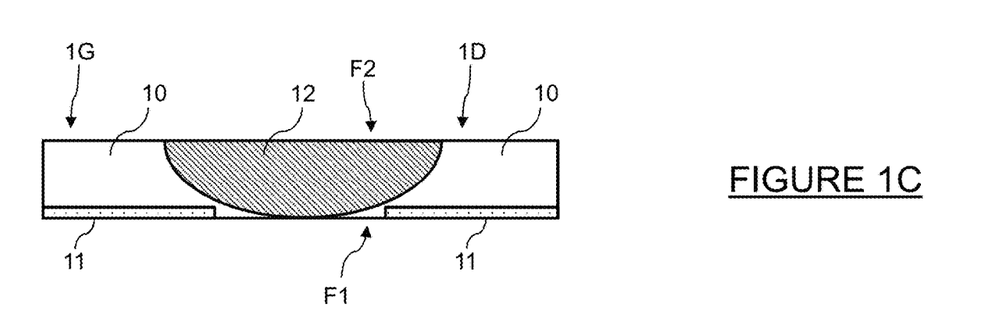
FIG. 1C is a cross-section view of the ends of elementary panels after friction stir welding.

To remove the cladding 11 precisely using a machining tool, a step must be performed whereby the position of each elementary metal panel 1G, 1D is accurately measured. This measurement step is carried out by contact. In practice, a measurement tool performs a first measurement pass following a predetermined theoretical trajectory along the end of each elementary metal panel 1G, 1D in order to determine the vertical deviation between the theoretical trajectory and the real profile of said end. Using the theoretical trajectory and the vertical deviation, a corrected trajectory is calculated. A new contact measurement step can be performed based on the corrected trajectory in order to detect a potential new vertical deviation. The measurement step is completed when the last corrected trajectory is identical to the real profile, i.e. when the vertical deviation is nil. Once the measurement step is completed, the cladding 11 is removed U1 from the end of each elementary panel 1G, 1D by a machining tool using the last corrected trajectory (FIG. 1B). Then, the elementary panels 1G, 1D are butt jointed and welded to one another by friction stir welding. After welding, the elementary panels 1G, 1D are secured to one another by a weld bead 12 as shown in FIG. 1C.

The measurement steps are constraining as they are long and costly, and have to be performed manually by operators. Furthermore, such a measurement step does not provide optimal reliability to meet increasingly stringent requirement levels. Even if the measurement step were to be automated, it would not enable to meet reliability requirements.

The purpose of the invention is therefore to overcome these disadvantages by proposing a device and a method for machining an end of an aeronautical metal panel for its subsequent friction stir welding.

Although the invention was originally designed for an elementary panel comprising a cladding, the invention applies to any elementary panel from which one wishes to remove the thickness of at least one face of an end of said elementary panel.

Document GB1413106 A relates to a device to work on various longitudinal parts of an elongated piece (metal bar, metal sheet, etc.), in particular at various different longitudinal positions. The purpose of the device is to perform different operations at multiple longitudinal positions in an automated manner. Such a device is unable to remove a thickness in an accurate manner at an end of a panel. The device is not adapted for the machining of an end of an elementary panel to remove the thickness from one of its faces.

Document JP H10 52773 A relates to an assembly device using FSW. The device is not adapted for the machining of an end of an elementary panel to remove the thickness from one of its faces.

SUMMARY

For this purpose, the invention relates to a device for machining an end of an elementary panel for its subsequent friction stir welding, the elementary panel comprising a metal body defining two opposite faces, the machining device comprising:
  a chassis,
  at least two guiding members, mounted on the chassis and aligned along a horizontal reference direction, the guiding members being configured to guide a first face of the elementary panel,
  at least one machining tool mounted on the chassis, the machining tool being positioned between the two guiding members with respect to the horizontal reference direction and to a vertical position determined with respect to the horizontal reference direction in order to remove a thickness of at least one face of the elementary panel, and
  at least one pressure member mounted on the chassis and configured to exert a pressure on a second face of the elementary panel so as to press the elementary panel against the guiding members along the horizontal reference direction.

The machining device according to the invention allows the elementary panel to be guided in an accurate manner in the frame of reference of the machining device. Therefore, it is no longer necessary to measure beforehand the position of the elementary panel, which increases reliability and allows for a gain of time. The use of guiding and pressure members enables to constrain locally the elementary panel so that it extends in a predetermined plane during machining operations. Therefore, even if the elementary panel comprises globally one or several curvatures, it is deformed locally to extend perfectly along the horizontal reference direction. This enables to accurately remove a thickness of the first face, as it extends along the horizontal reference direction.

Preferably, the horizontal reference direction is defined between the two summits of the guiding members.

Preferably, the machining device comprises two pressure members, each pressure member being mounted symmetrically to a guiding member with respect to the horizontal reference direction, so as to sandwich the elementary panel. The elementary panel is therefore perfectly maintained between two reference points. At each reference point, a guiding member cooperates with a pressure member to block any unwanted movement of the elementary panel.

Preferably, the machining device being configured to move from upstream to downstream, the machining device comprises two upstream guiding members and two downstream guiding members. Also preferably, the machining device comprises two upstream pressure members and two downstream pressure members. Advantageously, this increases the accuracy of the positioning of the machining tool while avoiding deformations of the elementary panel. Indeed, the panel is maintained in four reference points, which prevents any local offset.

In a preferred manner, each pressure member is mobile with respect to the horizontal reference direction. Therefore, each pressure member enables to adapt the exerted force when the thickness of the elementary panel changes along its length. Preferably, each guiding member is fixed with respect to the horizontal reference direction. In other words, even if the guiding member is able to rotate about an axis to guide the elementary panel, its position remains fixed with respect to the horizontal reference direction to define a stable frame of reference in the machining device.

According to one aspect of the invention, the lateral dimension of the guiding members, defined orthogonally to the horizontal reference direction, is greater than the lateral machining dimension of the machining tool, so as to enable optimal guiding of the machined portion by the guiding members. In other words, the guiding members downstream from the machining tool remain in contact with a non-machined portion of the end of the elementary panel in order to avoid any positioning defects. The machining tool is aligned with the guiding members according to the horizontal reference direction.

According to another aspect of the invention, the machining tool is laterally offset with respect to the horizontal reference direction defined by the guiding members so that the guiding members do not come into contact with a machined portion of the end of the elementary panel during the displacement of the machining device.

Preferably, the guide members are spaced in the horizontal direction by a distance between 50 mm and 150 mm, preferably between 60 mm and 150 mm. Such spacing makes it possible to achieve high precision guidance near the machining tool.

Preferably, only the chassis is configured to be moved during machining, the relative position of the machining tool from the guiding members is constant and precise. In other words, the position of the machining tool remains fixed in the reference frame of the guide members, which makes it possible to ignore the overall reference frame of the machining tool. The chassis can thus follow the profile of the end of the panel. When positioning the guiding members, the machining tool is always in the correct machining position. The precision is thus very important, which is very advantageous when decladding in order to remove a calibrated thickness In a preferred manner, the machining tool comprises at least one blowing member configured to evacuate the machining chips away from the guiding and/or pressure members. This blowing member prevents machining chips from being deposited between the elementary panel and a pressure or guiding member, which would affect the positioning of the elementary panel in the machining device, and therefore the accuracy of machining operations.

Also preferably, the machining device comprises at least one sweeping member configured to sweep at least one face of the elementary panel. Such a sweeping member enables to catch any machining chip present on the elementary panel in order to ensure great machining accuracy. In a preferred manner, the sweeping member is positioned between the machining tool and a guiding member. Therefore, the guiding member cannot be pressed against a machining chip, which would affect the positioning.

The use of blowing/suction/sweeping members enables to process the machining chips while ensuring a high speed of advancement.

Preferably, the chassis comprising a lower part and an upper part, between which the vertical spacing is adjustable, the guiding members are mounted on the lower part, whereas the machining tool is mounted on the upper part of the chassis. Therefore, the machining height is defined with a very high degree of accuracy.

According to a preferred aspect of the invention, the chassis comprises a mobile base configured to enable the rotation of the machining device about a vertical axis. Therefore, the machining tool can rotate by 180° so as to enable a machining of a left elementary panel and then of a right elementary panel. Although it provides a high degree of accuracy, the machining device remains convenient to use for the purpose of welding elementary panels together.

The invention also relates to a system for machining and welding an end of an elementary panel, the machining and welding system comprising at least one device for supporting at least one elementary panel, a device for displacing a functional unit with respect to the support device and a machining device such as described above, the machining device being connected to the functional unit to enable the removal of a thickness from at least one face of an elementary panel mounted on a support device.

Advantageously, the machining and welding system enables to accurately position the elementary panel and to move the machining device along its end so as to remove a thickness of material.

According to a preferred aspect of the invention, the machining and welding system comprises two support devices and a friction stir welding device connected to the functional unit so as to enable the friction stir welding of the ends of the elementary panels mounted on the support devices. Therefore, the support devices enable to support the elementary panels during the machining and then the friction stir welding. The machining and welding steps can be performed consecutively, which improves the bond quality of the elementary panels.

The invention further relates to a method for machining an end of an elementary panel for its subsequent friction stir welding by means of a machining device such as described above, the elementary panel comprising a metal body defining two opposite faces, the first face of the elementary panel bearing against the guiding members, the process comprising:

A step whereby pressure is exerted by the pressure member on the second face of the elementary panel so as to press the elementary panel against the guiding members along the horizontal reference direction, A step whereby the machining tool is rotationally driven about a vertical axis, A step whereby the machining device is moved with respect to the elementary panel in the horizontal reference direction so as to remove a thickness from at least one face of the elementary panel.

With the invention, the elementary panel is constrained in the machining frame of reference of the machining device, which avoids having to perform a measurement step, which is time-consuming and lacks accuracy.

Preferably, the elementary panel is pressed in the vicinity of the end of the elementary panel that is to be machined. The end of the elementary panel extends in a cantilevered fashion during machining operations.

In a preferred manner, at least one face of the elementary panel is covered with a cladding and the machining device is moved with respect to the elementary panel in the horizontal reference direction so as to machine the cladding. Preferably, the first face of the elementary panel is machined as its position is determined with great accuracy by the guiding members.

Preferably, the process comprises a friction stir welding step of two elementary panels after machining operations. The elementary panels are individually machined and then butt joined to be welded by friction stir welding.

As the machining step is carried out in an accurate manner, the quality of the friction stir welding is optimal.

BRIEF DESCRIPTION OF THE DRAWINGS

The invention will be better understood upon reading the following description, provided solely by way of an example, and with reference to the appended figures, wherein.

It should be noted that the figures provide a detailed view of the invention to illustrate its implementation, and that said figures can naturally also serve to better define the invention as necessary.

DETAILED DESCRIPTION

Figure 2:
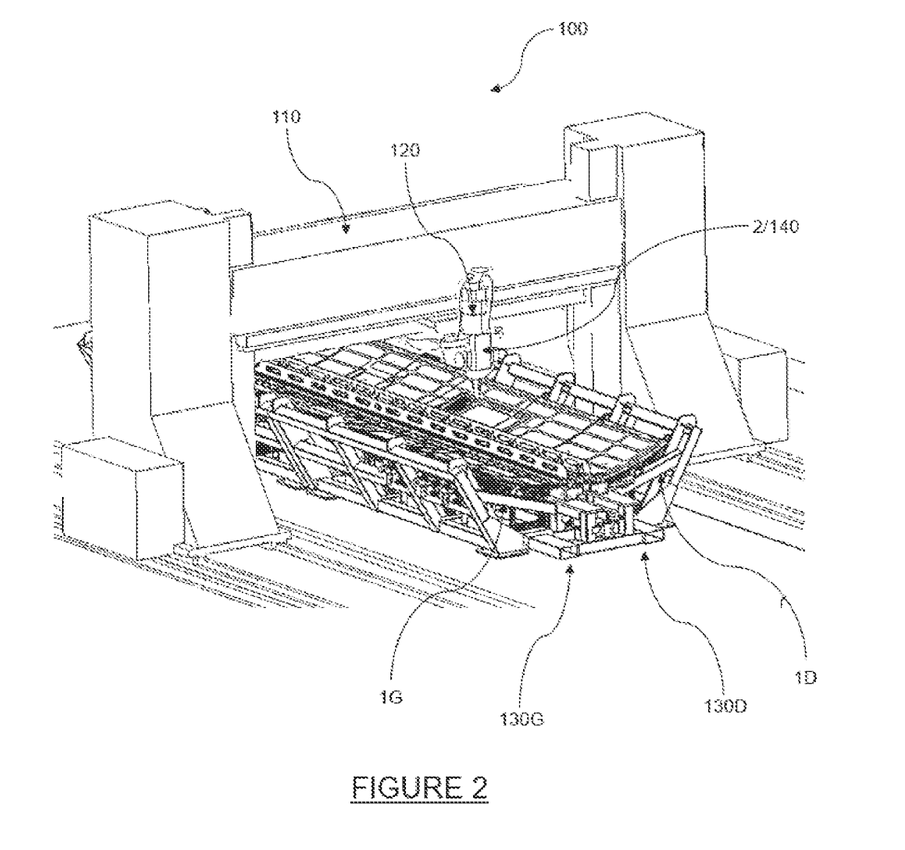
FIG. 2 is a perspective view of a machining and welding system according to one embodiment of the invention.

FIG. 2 shows a machining and welding system 100 of two elementary panels 1G, 1D.

The machining and welding system 100 comprises a left support device 130G whereon is positioned a left elementary panel 1G and a right support device 130D, whereon is positioned a right elementary panel 1D.

As shown in FIG. 1A, an elementary panel 1G, 1D comprises a metal body 10 defining two opposite faces F1, F2, of which at least one face is covered with a cladding 11 that is to be removed. In this example, the metal body 10 is made of an aluminum alloy and has a thickness ranging from 1 mm to 3 mm. The cladding 11 is made of pure aluminum and has a thickness ranging from 0.1 mm to 0.3 mm. In a preferred manner, the cladding 11 has a constant thickness. However, the metal body 10 has a thickness that can vary along the end of the panel 1G, 1D. As indicated above, the cladding 11 must be removed accurately at the end of the panel 1G, 1D so as to guarantee a weld with optimal quality. Because of its thinness, such an elementary panel 1G, 1D remains flexible and can be flattened by plastic deformation, even if it comprises one or several curvatures.

The invention is presented for an elementary panel 1G, 1D comprising a cladding that is to be removed on the first face F1, but the invention also relates to an elementary panel 1G, 1D that does not comprise a cladding and for which one wishes to remove a thickness from one face of the metal body 10.

The machining and welding system 100 comprises a displacement device 110 that, in this example, is in the form of a displacement gantry crane as shown in FIG. 2. The displacement device 110 comprises a functional unit 120 whereon can be mounted various devices, in particular a machining device 2 and a friction stir welding device 140. The functional unit 120 advantageously enables to provide electric, mechanical, hydraulic, and pneumatic power to the connected devices.

As is described below, the displacement device 110 enables, on one hand, to move the machining device 2 in order to remove the cladding at the end of each elementary panel 1G, 1D, and, on the other hand, to move the friction stir welding device to secure the elementary panels 1G, 1D to one another. In other words, with the machining and welding system 100, two elementary panels 1G, 1D are welded in a quick and practical manner.

In this example, with reference to FIG. 2, the support devices 130G, 130D are configured to support, in a fixed manner, the elementary panels 1G, 1D, while maintaining the end to be machined in a cantilevered fashion so as to facilitate the passage of the machining device 2.

With the machining and welding system 100 according to the invention, the machining device 2 is accurately positioned with respect to an elementary panel 1G, 1D that is maintained in a fixed manner, and then the machining device 2 is moved along an end of the elementary panel 1G, 1D to perform machining operations accurately.

FIGS. 3 to 10 show a machining device 2 according to an embodiment of the invention to machine an end of a left elementary panel 1G for its subsequent friction stir welding.

Figure 3:
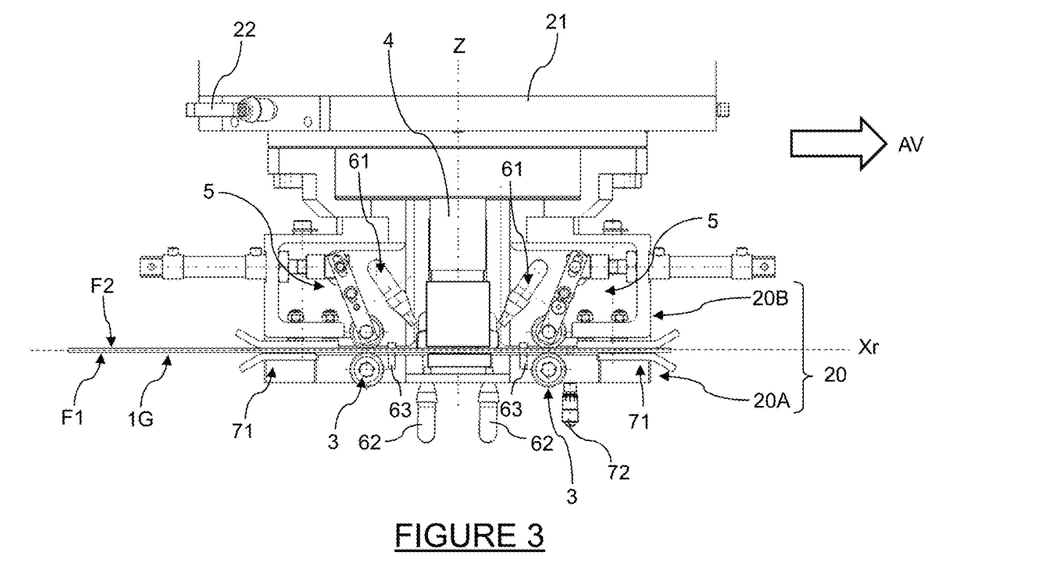
FIG. 3 is a front view of a machining device according to one embodiment of the invention.
Figure 4:
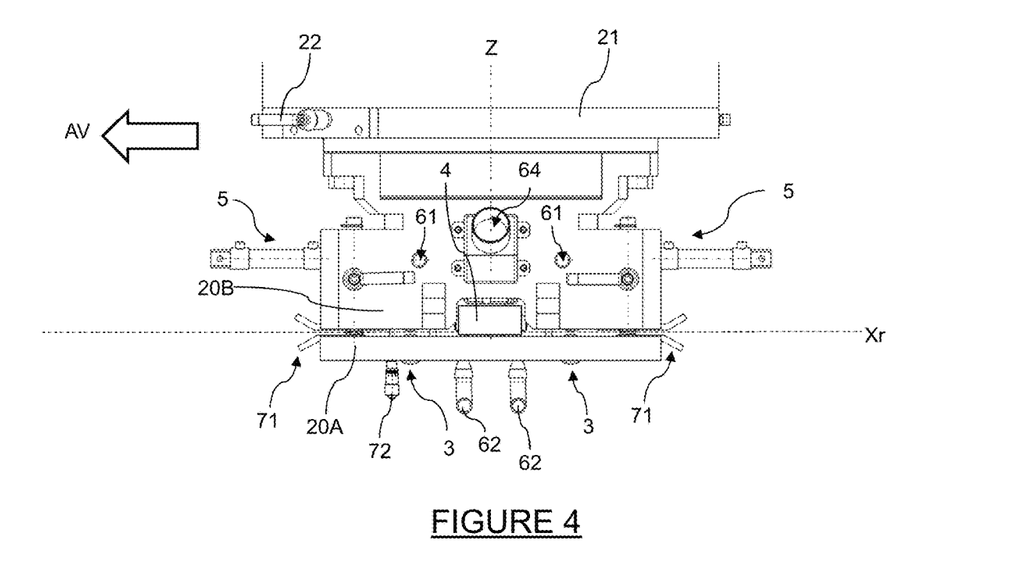
FIG. 4 is a rear view of the machining device of FIG. 3.
Figure 5:
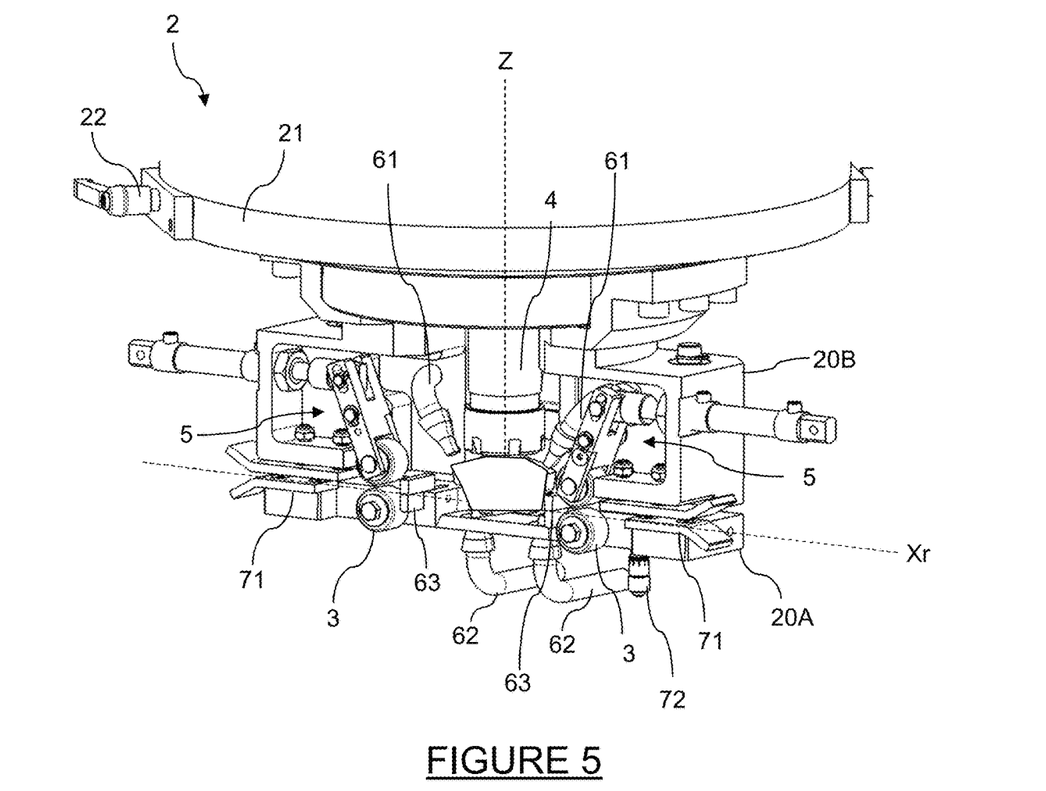
FIG. 5 is a perspective view of the machining device of FIG. 3.

As shown in FIGS. 3 and 4, the machining device 2 comprises a chassis 20 and two guiding members 3 mounted on the chassis 20 and aligned along a horizontal reference direction Xr, the guiding members 3 being configured to guide a first face F1 of an elementary panel 1G in order to accurately define its position. The machining device 2 further comprises a machining tool 4 mounted on the chassis 20, the machining tool 4 being positioned between the two guiding members 3 at a vertical position determined with respect to the horizontal reference direction Xr in order to remove at least the cladding 11 of the elementary panel 1G. Still with reference to FIG. 3, the machining device 2 comprises two pressure members 5 configured to exert a pressure on the second face F2 of the elementary panel 1G in order to press the elementary panel 1G against the guiding members 3.

With such a machining device 2, an elementary panel 1G is positioned in an accurate and reliable manner in the frame of reference of the machining device 2, which guarantees a very high level of machining accuracy ensuring optimal friction stir welding.

The various members of the machining device 2 will now be presented individually.

As shown in FIG. 4, the chassis 20 of the machining device 2 supports the various members as is described below.

In this example, the chassis 20 comprises a lower part 20A whereon are mounted the guiding members 3 and an upper part 20B whereon is mounted the machining tool 4. The vertical distance between the lower part 20A and the upper part 20B is adjustable by means of a vernier 72 or a micrometric abutment, which enables to indirectly adjust the vertical position of the machining tool 4 with respect to the horizontal reference direction Xr. This type of adjustment provides a high degree of accuracy. By way of example, a positioning error less than 0.05 mm can be achieved.

Figure 7:
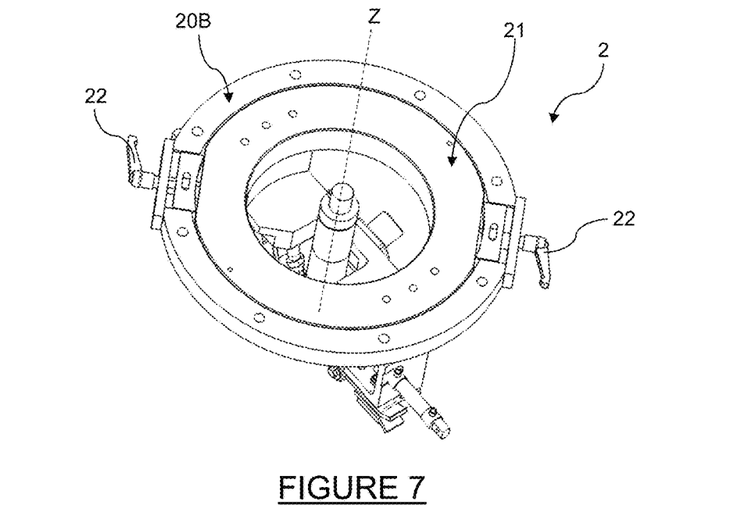
FIG. 7 is a horizontal cross-section view of the machining device of FIG. 3.
Figure 11:
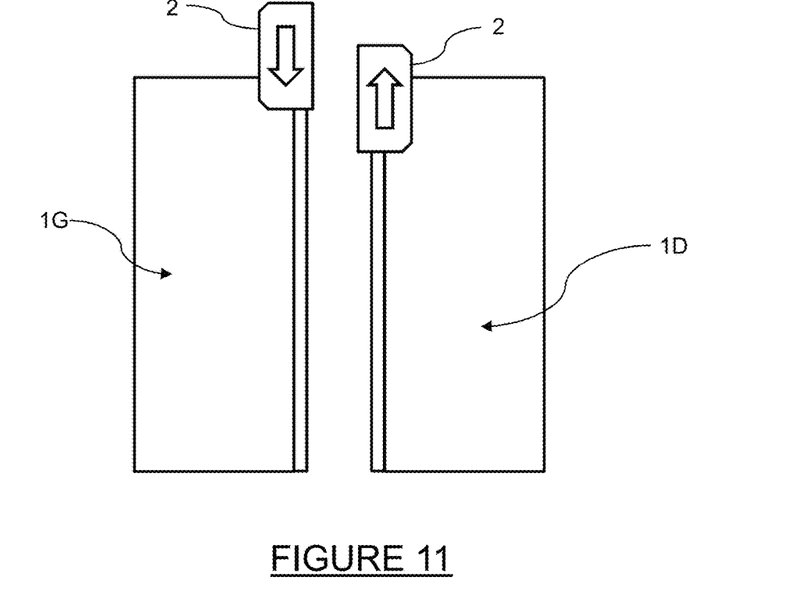
FIG. 11 is a top view of the machining of a left elementary panel and then of a right elementary panel.

In this example, with reference to FIG. 7, the chassis 20 comprises a mobile base 21 configured to enable the rotation of the machining device 2 about a vertical axis Z. The mobile base 21 can pivot with respect to the upper part 20B of the chassis 20 about a vertical axis Z in order to modify the orientation of the machining device 2 to machine both a left elementary panel 1G and a right elementary panel 1D, as shown in FIG. 11. In this example, the machining device 2 can rotate by 180°. With reference to FIG. 7, the chassis 20 comprises clamping jaws 22 to maintain fixed the mobile base 21 with respect to the upper part 20B in both configurations of use, the clamping jaws 22 being open to change configuration.

As shown in FIGS. 3 and 4, the machining device 2 comprises two guiding members 3 configured to guide a first face F1 of the elementary panel 1G, in this example, the lower face F1. Each guiding member 3 is in the form of rollers to enable guiding by rolling without the risk of marking/scratching the lower face F1 of the elementary panel 1G.

Figure 8:
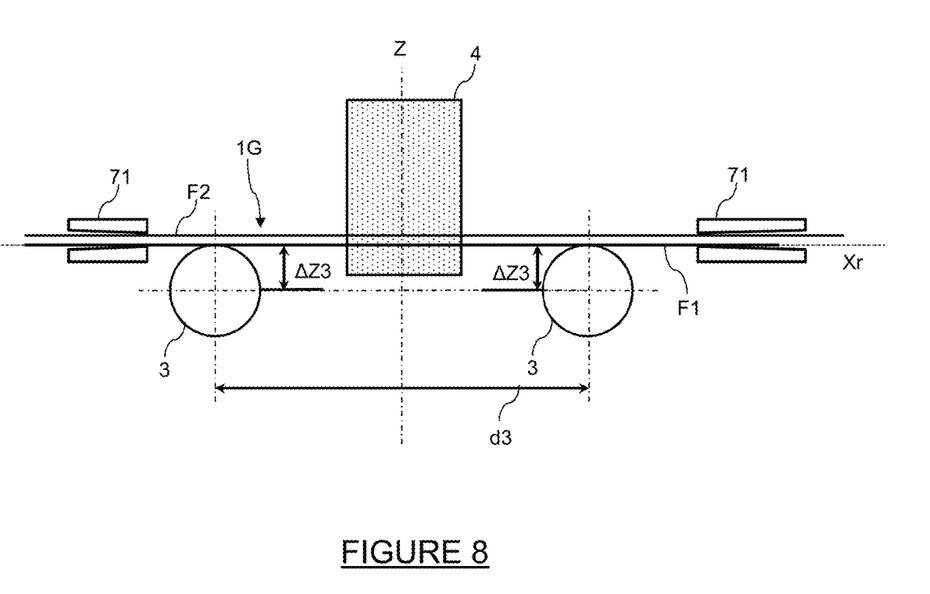
FIG. 8 is a schematic view of the positioning of the machining tool with respect to the horizontal reference direction.

The guiding members 3 are mounted on the chassis 20 and aligned in a horizontal reference direction Xr. The guiding members 3 are rotationally mobile so as to allow guiding by rolling along the horizontal reference direction Xr. Therefore, the guiding members 3 form a frame of reference that is specific to the chassis 20. In a preferred manner, as shown in FIG. 8, the horizontal reference direction is defined at the summit of the guiding members 3. The accuracy ΔZ3 between the centre of a guiding member 3 and the horizontal reference direction Xr is less than 0.05 mm as shown in FIG. 8. In a preferred manner, each guiding member 3 is rigid so as to provide the smallest possible positioning tolerance. Each guiding member 3 preferably has an outer polymer cladding to limit the risk of marking of the elementary panel 1G.

In a preferred manner, with reference to FIG. 8, the guiding members 3 are spaced along the horizontal direction by a distance d3 that has to be minimal to ensure proper maintaining, while being sufficiently big to provide a working space for the machining tool 4 between the guiding members 3 and prevent the insertion of machining chips. In a preferred manner, for a machining tool 4 with a diameter of 50 mm, a distance d3 ranging from 50 mm to 150 mm is suitable, preferably from 60 mm to 150 mm. Such a gap is small with respect to the curvature radius of an elementary panel 1G, which enables to consider that the elementary panel 1 is locally flat between the guiding members 3 when it is pressed against the guiding members 3.

Hereinafter, it is considered that the machining device 2 moves along the arrow AV, i.e. from the left to the right in FIG. 3. The guiding member 3 located in the leftmost position is described as "upstream guiding member", whereas the guiding member 3 located in the rightmost position is described as "downstream guiding member". The terms upstream and downstream are defined with respect to the horizontal reference direction.

In order to remove the cladding 11 at the end of the elementary panel 1G, the machining device 2 comprises a machining tool 4 mounted on the chassis 20, in particular on its upper part 20B. As shown in FIG. 3, the machining tool 4 is positioned between the two guiding members 3 at a determined vertical position with respect to the horizontal reference direction Xr. The vertical position of the machining tool 4 is easy to ensure, as it is defined by adjustment of the vertical distance between the lower part 20A and the upper part 20B of the chassis 20. Contrary to the prior art that imposed to detect beforehand the position of the elementary panel 1G with a high degree of accuracy, the elementary panel 1 is guided in the reference frame of the chassis 20 for which the position of the machining tool 4 is perfectly defined. The reliability of the machining operation is thereby greatly improved.

In this example, the machining tool 4 comprises a machining surface to machine a lower face, but it can also comprise other machining surfaces to machine an upper face and/or a lateral face (side) of the end of the elementary panel 1G. Therefore, the machining tool 4 enables to perform a full machining of the elementary panel 1G. By way of an example, the machining tool 4 is rotationally driven along the vertical direction at a rotation speed ranging from 2000 to 4000 rev/min.

In a preferred manner, the lateral dimension of the guiding members 3, defined orthogonally to the horizontal reference direction Xr, is greater than the lateral machining dimension of the machining tool 4, so as to enable optimal guiding of the machined portion by the guiding members 3. By way of example, the width of the guiding members 3 is of 10 mm, whereas the lateral machining dimension is of approximately 3 mm. Therefore, the guiding members 3 downstream from the machining tool 4 remain in contact with a non-machined portion of approximately 7 mm from the end of the elementary panel 1G, in order to avoid any positioning defects. The machining tool 4 is aligned with the guiding members 3 according to the horizontal reference direction Xr.

Alternately, the machining tool 4 is laterally offset with respect to the horizontal reference direction Xr defined by the guiding members 3 so that the guiding members 3 do not come into contact with a machined portion of the end of the elementary panel 1G during the displacement of the machining device 2.

As described above and still with reference to FIG. 3, the machining device 2 comprises two pressure members 5 configured to exert a pressure on the second face F2 of the elementary panel 1G in order to press the elementary panel 1G against the guiding members 3. In order to achieve optimal guiding, the pressure members 5 are vertically aligned with the guiding members 3. The pressure member 5 located in the leftmost position is described as "upstream pressure member", whereas the pressure member 5 located in the rightmost position is described as "downstream pressure member".

Therefore, the end of the elementary panel 1G is sandwiched in two different horizontal positions, upstream and downstream from the machining tool 4, to guarantee an alignment of the end of the elementary panel 1G with the horizontal reference direction Xr with respect to which the machining tool 4 is positioned with a great degree of accuracy.

In this embodiment, the pressure members 5 are identical. For purposes of clarity and brevity, only the upstream pressure member 5 is described with reference to FIGS. 5 and 6.

Figure 6:
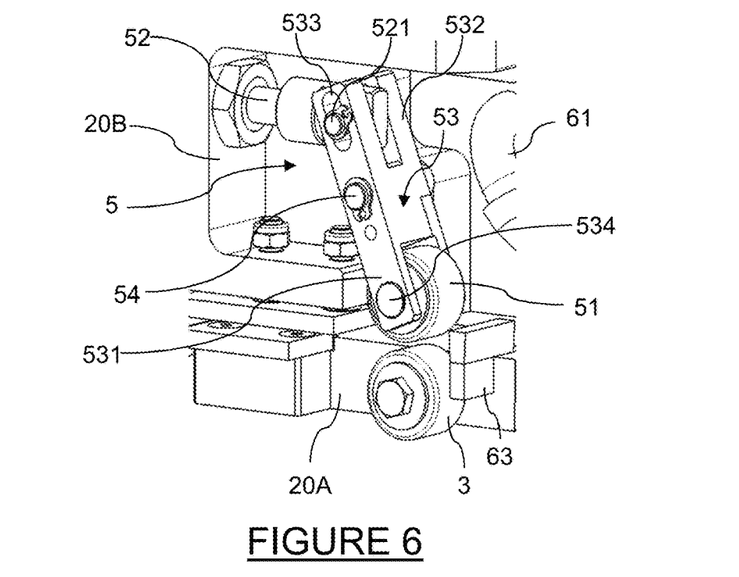
FIG. 6 is an enlarged view of a pressure member of the machining device of FIG. 5.

With reference to FIG. 6, the upstream pressure member 5 comprises a roller 51 in order to enable guiding by rolling without the risk of marking/scratching the upper face F2 of the panel 1. Similarly to a guiding member 3, the roller 51 is rigid so as to afford the smallest possible positioning tolerance and preferably has an outer polymer cladding to limit the risk of marking the elementary panel 1G. The upstream pressure member 5 further comprises a cylinder 52 to exert a vertical downwards force in the direction of the upstream guiding member 3. In this example, the cylinder 52 is connected to the roller 51 by means of a mechanism 53 that enables to perform a curved travel motion. However, the cylinder 52 could naturally be directly connected to the roller 51.

As shown in FIG. 6, the cylinder 52 of the upstream pressure member 5 extends horizontally and comprises, at the level of its head, a probe or pin 521 connected to the mechanism 53. The mechanism 53 is in the form of a longitudinal part or arm comprising a lower end 531 connected to the roller 51 by a pivot connection 534 and an upper end 532 comprising a longitudinal slot 533 wherein the probe 521 of the cylinder 52 is able to move with a sliding pivot-type connection. The longitudinal part forming the mechanism 53 is hinged to the upper part 20B of the chassis 20 about an axis 54 at which a pin is located. Therefore, the upstream pressure member 5 performs a tightening/releasing of the elementary panel 1G by performing a kinematic motion along a circular arc, which enables to exert a gradual and controlled pressure on the upper face F2 of the elementary panel 1G. As can be seen in FIG. 6, the roller 51 is located below both the probe or pin 521 and the pin at axis 54.

To tighten an elementary panel 1G, with reference to FIG. 6, the cylinder 52 extends to the right and the probe 521 penetrates in the longitudinal slot 533 to rotationally drive the mechanism 53 clockwise about the axis 54, which moves the roller 51 downwards against the elementary panel 1G along a circular arc trajectory. Inversely, to release an elementary panel 1G, the cylinder 52 extends to the left and the probe 521 moves upwards in the longitudinal slot 533 to rotationally drive it anticlockwise about the axis 54, which moves the roller 51 vertically upwards at a distance from the elementary panel 1G along a circular arc trajectory.

Advantageously, each pressure member 5 comprises a pressure regulation element, preferably integrated to the cylinder 52, in order to calibrate the pressure applied to the elementary panel 1G during tightening. Such a pressure regulation element enables to apply a substantially constant pressure, even when the thickness of the elementary panel 1G is not constant. Therefore, in the case of excess thickness, the roller 51 of the pressure member 5 is in a more elevated position and the pressure is adapted to optimally press the elementary panel 1G. Preferably, the pressure regulation element is in the form of an electronic calculation unit that is functionally connected to the cylinder 52. In a preferred manner, the pressure exerted by a pressure member 5 is ranging from 10N to 300N, in particular less than 150N. The pressure member 5 could exert a more important pressure, for example, up to 5000N.

Two guiding members 3 associated with two pressure members 5 (an upstream set and a downstream set) have been described, but naturally there can be more guiding members 3 and pressure members 5. In particular, four guiding members 3 associated with four pressure members 5 (two upstream sets and two downstream sets) enable to optimise the dimensional control of the elementary panel 1G to improve the positioning accuracy of the machining tool 4, thereby preventing a domed effect of the elementary panel 1G.

With reference to FIG. 3, the machining device 2 comprises two global alignment members 71, in particular of the drain type. Similarly to the above description, the machining device 2 comprises an upstream global alignment member 71 located upstream from the upstream guiding member 3, and a downstream global alignment member 71 located downstream from the downstream guiding member 3. Global alignment members 71 enable to centre the end of an elementary panel 1G prior to machining operations. Therefore, the elementary panel 1G is progressively constrained to accurately control the position of the elementary panel 1G in the reference frame of the machining device 2.

The global alignment members 71 are aligned along the horizontal reference direction Xr. Each global alignment member 71 has a shape that converges along the horizontal reference direction Xr towards the machining tool 4. Such global alignment members 71 enable to globally guide the end of the elementary panel 1G before preforming a constrained guiding in the immediate vicinity of the machining tool 4 with the guiding members 3 and the pressure members 5. In this example, each global alignment member 71 comprises two tilted metal sheets, but naturally it could comprise one or several rollers.

Still with reference to FIG. 3, the machining device 2 also comprises two upper blowing members 61, in particular an upper blowing member 61 located upstream from the machining tool 4 and an upper blowing member 61 located downstream from the machining tool 4. The upper blowing members 61 enable to blow air on the upper face F2 of the elementary panel 1G. Therefore, the metal chips generated during machining operations are blown away from the pressure members 5, which avoids any local excess thickness that could affect the positioning of the elementary panel 1G or a degradation of the frame of reference. Similarly, each upper blowing member 61 is located between the machining tool 4 and the pressure member 5 in order to prevent machining chips to come into contact with the pressure member 5.

Similarly, still with reference to FIG. 3, the machining device 2 also comprises two lower blowing members 62, in particular a lower blowing member 62 located upstream from the machining tool 4 and a lower blowing member 62 located downstream from the machining tool 4. The lower blowing members 62 enable to blow air on the lower face F1 of the elementary panel 1G. Therefore, the metal chips generated during machining operations are blown away from the guiding members 3, which avoids any local excess thickness that could affect the positioning of the elementary panel 1G or a degradation of the frame of reference. Similarly, each lower blowing member 62 is located between the machining tool 4 and the guiding member 3 in order to prevent machining chips to come into contact with the guiding member 3.

Such blowing members 61, 62 also prevent marking of the elementary panel 1G by machining chips.

In a preferred manner, the machining chips are retrieved by suction. For this purpose, with reference to FIG. 4, the machining device 2 comprises a suction member 64 in the vicinity of the machining tool 4 in order to suction the machining chips. The upper blowing members 61 are tilted towards the machining tool 4 so as to facilitate a central suction by the suction member 64. Therefore, the horizontal reference direction Xr is protected during machining operations to prevent any deviation and to ensure accurate machining operations.

Preferably, as shown in FIG. 3, the machining device 2 also comprises two sweeping members 63, in particular an upstream sweeping member 63 located upstream from the machining tool 4 and a downstream sweeping member 63 located downstream from the machining tool 4. The sweeping members 63 are aligned along the horizontal reference direction Xr. In this example, each sweeping member 63 is configured to sweep the lower face F1 and the upper face F2 of the elementary panel 1G. However, a sweeping member 63 could naturally sweep only one face of the elementary panel 1G. Therefore, the metal chips generated by the machining operations are swept so as not to come into contact with the pressure members 5 and the guiding members 3, thereby avoiding any local excess thickness that could affect to orientation of the horizontal reference direction Xr. Therefore, the horizontal reference direction Xr is protected during machining operations to prevent any deviation and to ensure accurate machining operations.

Optionally, the machining device 2 comprises one or several probes to measure the thickness of the elementary panel 1G, 1D after machining of its end to allow quality controls to be performed. A measurement probe of the laser type is preferred.

In a preferred manner, the machining device 2 is mounted on a functional unit 120 of the machining and welding system 100 shown in FIG. 2. The displacement device 110 is connected to the mobile base 21 of the chassis 20 of the machining device 2 and enables to move it, in particular along a substantially straight line, so as to follow the end to be machined of the elementary panel 1G.

FIG. 11 shows a top view of a left elementary panel 1G and a right elementary panel 1D, the cladding 11 of which is to undergo machining operations (decladding operations). In this implementation, the machining device 2 is moved along the left elementary panel 1G, and then the machining device 2 is rotated by 180°, before being moved along the right elementary panel 1D.

Figure 9:
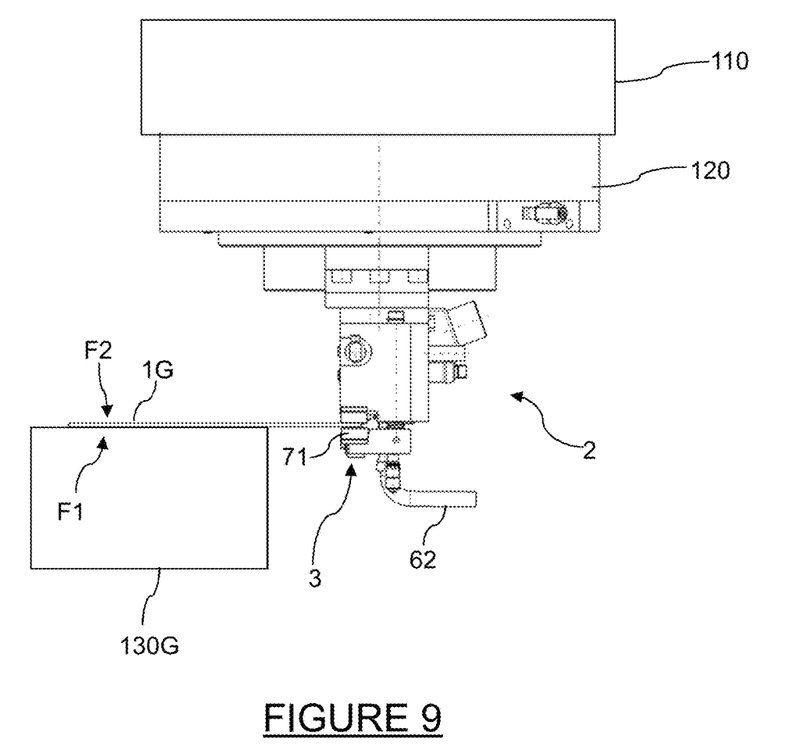
FIG. 9 is a side view of a step whereby a cladding of an elementary panel is removed by the machining device according to one embodiment of the invention.
Figure 10:
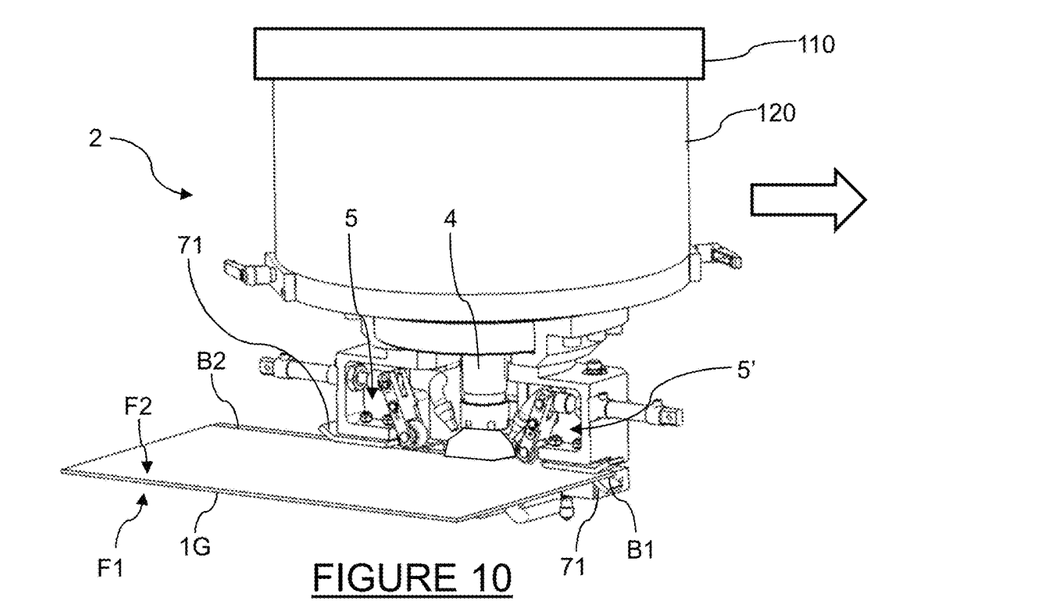
FIG. 10 is a perspective view of the removal step of FIG. 9.

The machining process of the left elementary panel 1G is now described with reference to FIGS. 9 and 10.

Similarly to a sewing machine, the left elementary panel 1G is moved with respect to the machining device 2 during the displacement of the functional unit 120 by the displacement device 110. The end of the left elementary panel 1G is centred by the global alignment members 71, then the guiding members 3 and the pressure members 5 constrain locally the left elementary panel 1G so that its end is locally flat between the two zones of constraint. Because of its reduced thickness, this plastic deformation does not affect the left elementary panel 1G, even if it comprises one or several curvatures.

The end of the left elementary panel 1G is maintained in the vicinity of the zone to be machined, which extends in a cantilevered fashion so as to provide a space for the machining tool 4.

Contrary to the prior art, it is not necessary to know the absolute position of the left elementary panel 1G, the machining device 2 following advantageously the end of the left elementary panel 1G to be positioned in a rigorous manner. Indeed, the guiding members 3 and the pressure members 5 define, in pairs, two reference positions along the horizontal reference direction Xr so as to perfectly control the position of the left elementary panel 1. As the machining tool 4 is positioned between these two reference positions, its position is defined very accurately, which guarantees highly accurate machining operations.

The machining tool 4 is rotationally driven and the machining device 2 is moved at a speed of advancement ranging from 150 to 800 mm/min. As the machining device 2 is moved, the cladding 11 of the left elementary panel 1 is removed accurately. The machining chips are blown, swept and/or suctioned so as not to affect the machining or the maintaining of the left elementary panel 1G between the two reference positions, which guarantees great accuracy. Depending on the shape of the machining tool 4, the lower face F1, the upper face F2 and/or the side face of the end of the left elementary panel 1G are machined so that the latter can be friction stir welded.

As shown in FIG. 11, once the left elementary panel 1G has been decladded, the clamping jaws 22 of the mobile base 21 are released so as to change the orientation of the machining device 2, which is then able to machine the right elementary panel 1D in the same manner as the left elementary panel 1G.

Figure 12:
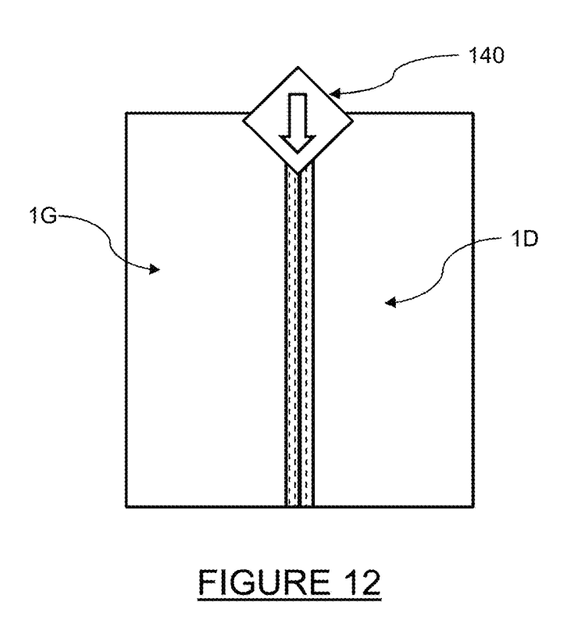
FIG. 12 is a top view of the welding of the elementary panels of FIG. 11.
Figure 13:
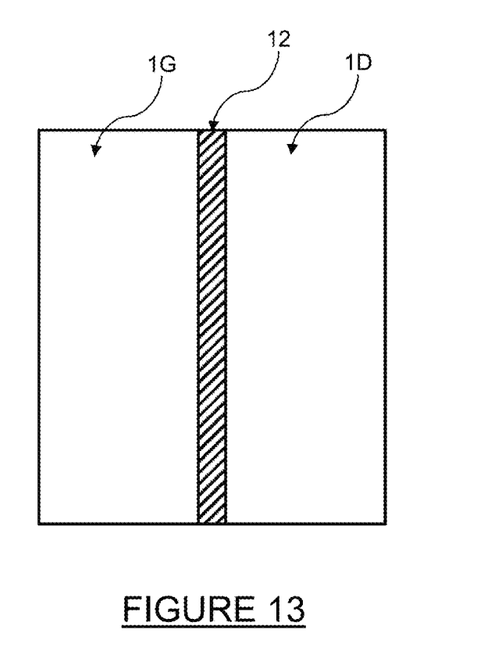
FIG. 13 is a top view of the welded elementary panels of FIG. 12.

After machining of the two panels 1G, 1D, the machining device 2 is disconnected from the functional unit 120 and replaced by a friction stir welding device 140, as shown in FIG. 12. The support devices 130G, 130D are adjusted so as to butt join the ends of the elementary panels 1G, 1D, as shown in FIG. 12. Then the friction stir welding device 140 is activated and moved by the displacement device 110 at the interface between the elementary panes 1G, 1D so as to weld them together in an optimal manner. The elementary panels 1G, 1D are linked to one another by a weld bead 12 as shown in FIG. 13.

Naturally, the machining and welding system 100 could also comprise several functional units 120 operating simultaneously to the machining device 2 and to the friction stir welding device 140.

With the machining and welding device 100 according to the invention, the elementary panels 1G, 1D are machined in a convenient manner with great accuracy. Furthermore, the integration in a same system of a machining device 2 and a welding device 140 enables significant productivity while limiting the number of handling operations of the elementary panels.

The elimination of repetitive contact measurement steps is a significant gain of time, while also improving reliability and reducing costs.

The invention claimed is:

1. A machining and welding system for machining and welding ends of elementary panels with each elementary panel comprising a respective metal body having a respective two faces including a first face and a second face, the machining and welding system comprising:
- a first support having a surface supporting a first of the elementary panels;
- a second support having a surface supporting a second of the elementary panels;
- a displacement device having a functional unit that is displaceable relative to the first and second support devices; and
- a machining device connectable to the functional unit and configured to remove a thickness from at least one of the two faces of the first elementary panel mounted on the first support device, the machining device comprising:
  - a chassis;
  - at least two guiding members mounted on the chassis, the at least two guiding members being aligned along a horizontal reference direction and configured to guide a first face (F1) of the first elementary panel;
  - at least one machining tool mounted on the chassis and positioned between the at least two guiding members with respect to the horizontal reference direction and being displaceable, relative to the horizontal reference direction, in a vertical direction; and
  - at least one pressure member mounted on the chassis along the horizontal reference direction and configured to exert a pressure on a second face of the first elementary panel so as to press the first elementary panel against the at least two guiding members; and
- a friction stir welding unit connectable to the functional unit to friction stir weld an end of the first elementary panel and an end of the second elementary panel together.

2. The machining and welding system according to claim 1, wherein the at least one pressure member comprises two pressure members, and wherein each of the pressure members is mounted symmetrically to one of the at least two guiding members with respect to the horizontal reference direction to sandwich the first elementary panel.

3. A machining process by means of the machining and welding system according to claim 1, the process comprising:
- a step whereby pressure is exerted by the at least one pressure member on the second face of the first elementary panel so as to press the first elementary panel against the at least two guiding members;
- a step whereby the at least one machining tool is rotationally driven about a vertical axis; and
- a step whereby the machining device is moved with respect to the first elementary panel in the horizontal reference direction so as to remove a thickness from at least one of the faces of the first elementary panel.

4. The machining process according to claim 3, wherein at least one of the faces of the first elementary panel is covered with a cladding and the machining device is moved with respect to the first elementary panel in the horizontal reference direction so as to machine the cladding.

5. The machining process according to claim 3, wherein the process further comprises a friction stir welding step of friction stir welding the first and the second elementary panels after the step of removing a thickness from at least one of the faces of the first elementary panel.

6. A machining and welding system for machining and welding ends of two adjacent elementary panels together, the machining and welding system comprising:
- a first support having a surface sized and shaped to support a first elementary panel;
- a second support having a surface sized and shaped to support a second elementary panel in side-by-side configuration relative to the first elementary panel;
- a crane structure connected to a mobile base, said crane structure having a displaceable functional unit attached thereto and the functional unit is adapted to separately connect to a machining device and to a friction stir welding device;
- wherein the machining device comprises:
  - a chassis;
  - two spaced apart guiding members mounted on the chassis, the two spaced apart guiding members aligned along a horizontal reference direction and configured to guide one of the elementary panels;
  - a machining tool mounted on the chassis and positioned between the two spaced guiding members and displaceable, relative to the horizontal reference direction, in a vertical direction; and
  - a pressure member mounted on the chassis and movable by a cylinder to exert pressure on one of the elementary panels that is located between the pressure member and at least one of the two spaced apart guiding members; and
- a friction stir welding device connectable to the functional unit without the machining device to friction stir weld an end of the first elementary panel and an end of the second elementary panel together.

7. The machining and welding system of claim 6, wherein the pressure member comprises an arm connected to an upper pin and a lower pin, and comprises a roller below the lower pin.

8. The machining and welding system of claim 7, wherein the chassis comprises a lower part comprising the two spaced apart guiding members and wherein the chassis also comprises an upper part comprising the pressure member, and wherein at least one blowing member is located on the upper part and oriented to blow at the one of the elementary panels that is located between the pressure member and the at least one of the two spaced apart guiding members.

9. The machining and welding system of claim 8, wherein the pressure member is a first pressure member, and the machining and welding system further comprising a second pressure member mounted on the chassis and movable by a second cylinder to exert pressure on the elementary panel that is located between the second pressure member and at least one of the two spaced apart guiding members.

* * * * *